Jan. 5, 1937.　　　C. J. ASHTON　　　2,067,114
PUSH ROD ASSEMBLY
Filed Jan. 30, 1936

Charles J. Ashton
INVENTOR
BY Victor J. Evans & Co.
ATTORNEY

Patented Jan. 5, 1937

2,067,114

UNITED STATES PATENT OFFICE 2,067,114

PUSH ROD ASSEMBLY

Charles J. Ashton, Highland Park, Mich.

Application January 30, 1936, Serial No. 61,609

1 Claim. (Cl. 123—90)

This invention relates to a push rod assembly and has for the primary object the provision of a device of this character which is adaptable for use for a valve-in-the-head type engine arranged between a rocker arm of a valve and the cam of a cam shaft of said engine and which will provide means for imparting movement to the rocker arm from the cam and will eliminate noises by keeping the parts of the valve assembled in constant contact with sufficient yieldability to compensate for expansion and contraction of the parts due to varying temperatures of the engine, thereby assuring proper seating of the valve under all conditions with noise eliminated.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a push rod assembly constructed in accordance with my invention.

Figure 1:
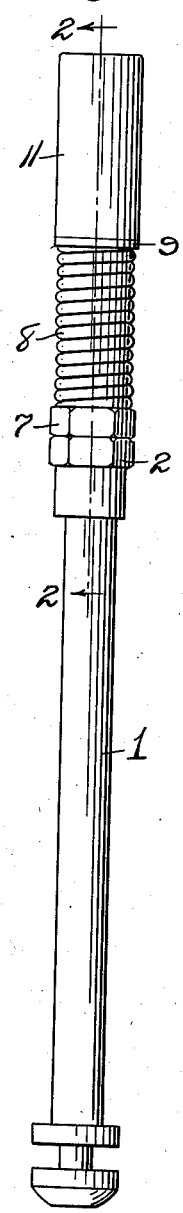
Figure 2:
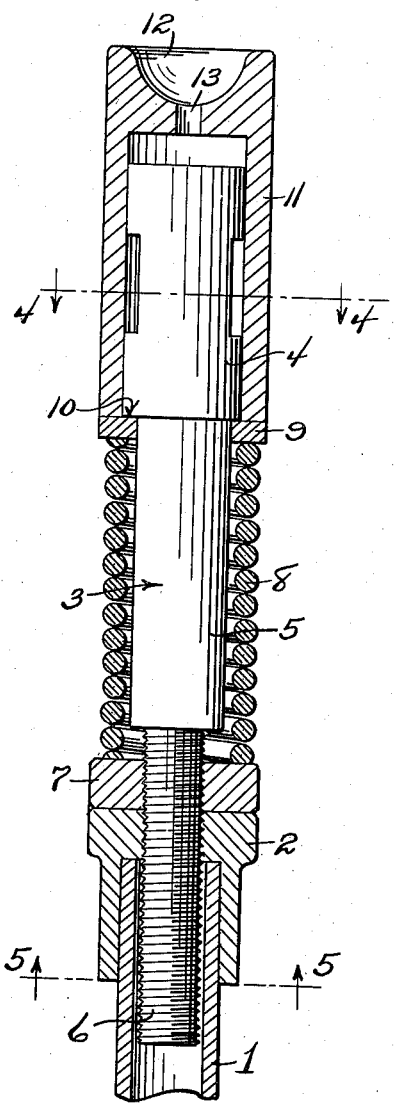
Figure 2 is a sectional view taken on the line 2—2 of Figure 1.
Figure 3:
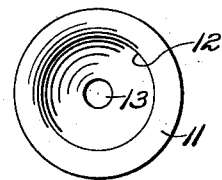
Figure 3 is an end elevation illustrating the device.
Figure 4:
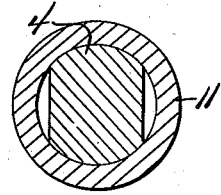
Figure 4 is a sectional view taken on the line 4—4 of Figure 2.
Figure 5:
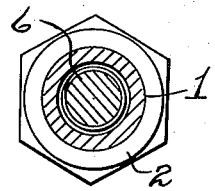
Figure 5 is a sectional view taken on the line 5—5 of Figure 2.

Referring in detail to the drawing, the numeral 1 indicates a push rod having one end constructed to engage a cam of a cam shaft and is of tubular formation with its other end engaged by a combined sleeve and nut 2. An adjusting member 3 includes portions 4, 5 and 6. These portions differ in diameter and the portion 6 is screw threaded and threads into the combined nut and sleeve 2. A lock nut 7 is applied to the portion 6 and turned against the combined nut and sleeve 2 for holding the screw threaded portion 6 against unthreading. The lock nut 7 forms a seat for one end of a coil spring 8 which surrounds the portion 5 of the member 3 with its other end bearing against the washer 9. The washer 9 engages a shoulder 10. The shoulder is formed by the different diameters of the portions 4 and 5. A tubular head 11 slidably receives the portion 4 of the member 3 and rests against the washer 9 at one end and the opposite end is cupped to form a seat 12 to receive the usual spherical-shaped end of an adjusting member employed on a rocker arm of a valve-in-the-head engine. An oil opening 13 communicates the seat 12 with the interior of the head for the purpose of lubricating the portion 4 of the member 3.

The device described when assembled to an engine of the character mentioned will be adjusted so that the spring 8 is of a strength slightly less than the strength of the usual valve spring. Also it is adjusted to provide a limited space between the portion 4 and the cupped end of the head 11 providing the necessary clearance between the usual rocker arm and the valve of the engine for compensating for expansion and contraction of the valve, consequently permitting the valve to always engage its seat when the push rod is in its lowermost position due to the cam of the cam shaft engaging the push rod 1 with its lower face. The raising of the push rod 1 is by the high face of the cam to unseat the valve of the engine. The spring 8 acts to keep the push rod 1 riding upon the cam of the cam shaft at all times and the seat 12 in contact with the adjusting bolt or member of the rocker arm of the valve assembly thereby eliminating noise.

Having described the invention, I claim:

A push rod assembly comprising a push rod, a combined sleeve and nut engaging the push rod, a member threaded to said combined nut and sleeve and including a substantially cylindrical portion, a lock nut applied to said member for engaging the combined nut and sleeve, a rocker arm head including a cylinder-like portion slidably receiving the cylindrical portion of said member and having a socket in one end to form a seat for a ball-type rocker arm adjusting element, said end of the head having an opening to admit lubricant to the interior of the head and to said member, a washer mounted on the member and engaging the other end of the head, and a coil spring mounted on the member and bearing against the washer and the lock nut.

CHARLES J. ASHTON.